(12) United States Patent
Snyder

(10) Patent No.: US 12,268,199 B2
(45) Date of Patent: Apr. 8, 2025

(54) ELECTRIC SNATCH HOOK SYSTEM

(71) Applicant: Elizabeth Snyder, Apopka, FL (US)

(72) Inventor: Elizabeth Snyder, Apopka, FL (US)

(*) Notice: Subject to any disclaimer, the term of this patent is extended or adjusted under 35 U.S.C. 154(b) by 0 days.

(21) Appl. No.: 18/600,475

(22) Filed: Mar. 8, 2024

(65) Prior Publication Data
US 2024/0206448 A1 Jun. 27, 2024

Related U.S. Application Data

(63) Continuation-in-part of application No. 18/215,537, filed on Jun. 28, 2023, now Pat. No. 11,968,986.

(60) Provisional application No. 63/451,389, filed on Mar. 10, 2023, provisional application No. 63/389,645, filed on Jul. 15, 2022.

(51) Int. Cl.
*A01K 99/00* (2006.01)
*A01K 83/00* (2006.01)
*H05C 1/00* (2006.01)

(52) U.S. Cl.
CPC ............. *A01K 99/00* (2013.01); *A01K 83/00* (2013.01); *H05C 1/00* (2013.01); *A01K 2227/00* (2013.01)

(58) Field of Classification Search
CPC .... A01K 99/00; A01K 83/00; A01K 2207/00; H05C 1/00; A22B 3/06; A22B 3/083; A22B 3/10
USPC ............................................. 452/57; 43/17.1
See application file for complete search history.

(56) References Cited

U.S. PATENT DOCUMENTS

| 3,083,491 A | * | 4/1963 | Meysan | A01K 85/16 |
| | | | | 43/17.1 |
| 4,627,187 A | | 12/1986 | Williams | |
| 5,259,139 A | * | 11/1993 | Ho | A01K 91/06 |
| | | | | 43/17.1 |
| 5,732,501 A | * | 3/1998 | Ausburn | A01K 97/14 |
| | | | | 43/17.1 |
| 6,183,356 B1 | | 2/2001 | Middleton et al. | |
| 7,174,668 B2 | | 2/2007 | Locklear | |
| 8,091,269 B2 | * | 1/2012 | Orchard | H05C 1/02 |
| | | | | 43/17.1 |
| 8,555,543 B2 | * | 10/2013 | Baldassano | F41B 15/04 |
| | | | | 43/17.1 |
| 2006/0168872 A1 | | 8/2006 | Locklear | |

* cited by examiner

*Primary Examiner* — Richard T Price, Jr.
(74) *Attorney, Agent, or Firm* — Jason T. Daniel, Esq.; Daniel Law Offices, P.A.

(57) ABSTRACT

An electric snatch hook system includes a hook having a plurality of hook segments each having a curved shape, a sharpened tip, and a plurality of electrodes. A control panel having a system controller, a user interface, a power source, and a power output unit is connected to the hook via an elongated tether and a control wire. The power source includes a plurality of batteries that provide power to the device components. The power output unit amplifies and sends power to the plurality of electrodes based on a command from the user interface. The power output is calculated to stun and immobilize a alligator for between about 1 and 3 minutes, to allow a user time to haul the alligator onto a boat or shoreline via the tether.

9 Claims, 4 Drawing Sheets

ELECTRIC SNATCH HOOK SYSTEM

CROSS-REFERENCE TO RELATED APPLICATIONS

This application claims the benefit of U.S. Application Ser. No. 63/451,389 filed on Mar. 10, 2023, and is a continuation in part to copending U.S. application Ser. No. 18/215,537 filed on Jun. 28, 2023, the contents of each of which are incorporated herein by reference.

TECHNICAL FIELD

The following disclosure contemplates various embodiments of a snatch hook that is capable of imparting an electrical shock onto an alligator from a plurality of terminals.

BACKGROUND

The statements in this section merely provide background information related to the present disclosure and may not constitute prior art.

One common method of hunting and capturing alligators involves the utilization of a large treble hook that is attached to a rope and dragged across the bottom of a lake or other body of water where an alligator is suspected to be found. Once the barbs of the treble hook pierce the skin of the alligator, a very intense fight ensues. Alligators are known to "death roll" where they violently twist and turn in effort to escape. Many hunters have been pulled into the water as a result of this activity which creates an extremely dangerous situation. In some instances, the animal is able to get away, but later dies from its injuries. Even when the animal is captured, the lactic acid built up by the struggle can ruin the taste of the meat, thus causing much of the animal to go to waste.

Accordingly, it would be beneficial to provide an electric snatch hook system that can aid hunters in quickly and humanely dispatching an alligator so as to eliminate the drawbacks and dangers noted above.

SUMMARY OF THE INVENTION

The present invention is directed to an electric snatch hook system. One embodiment of the present invention can include a hook having a plurality of hook segments each having a curved shape, a sharpened tip, and a plurality of electrodes. A control panel having a system controller, a user interface, a power source, and a power output unit is connected to the hook via an elongated tether and a control wire.

The power source can include a plurality of batteries that provide power to the device components. The power output unit can amplify and send power to the plurality of electrodes based on a command from the user interface. The power output can be calculated to stun and immobilize an alligator for between about 1 and 3 minutes, to allow a user time to haul the alligator onto a boat or shoreline via the tether.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
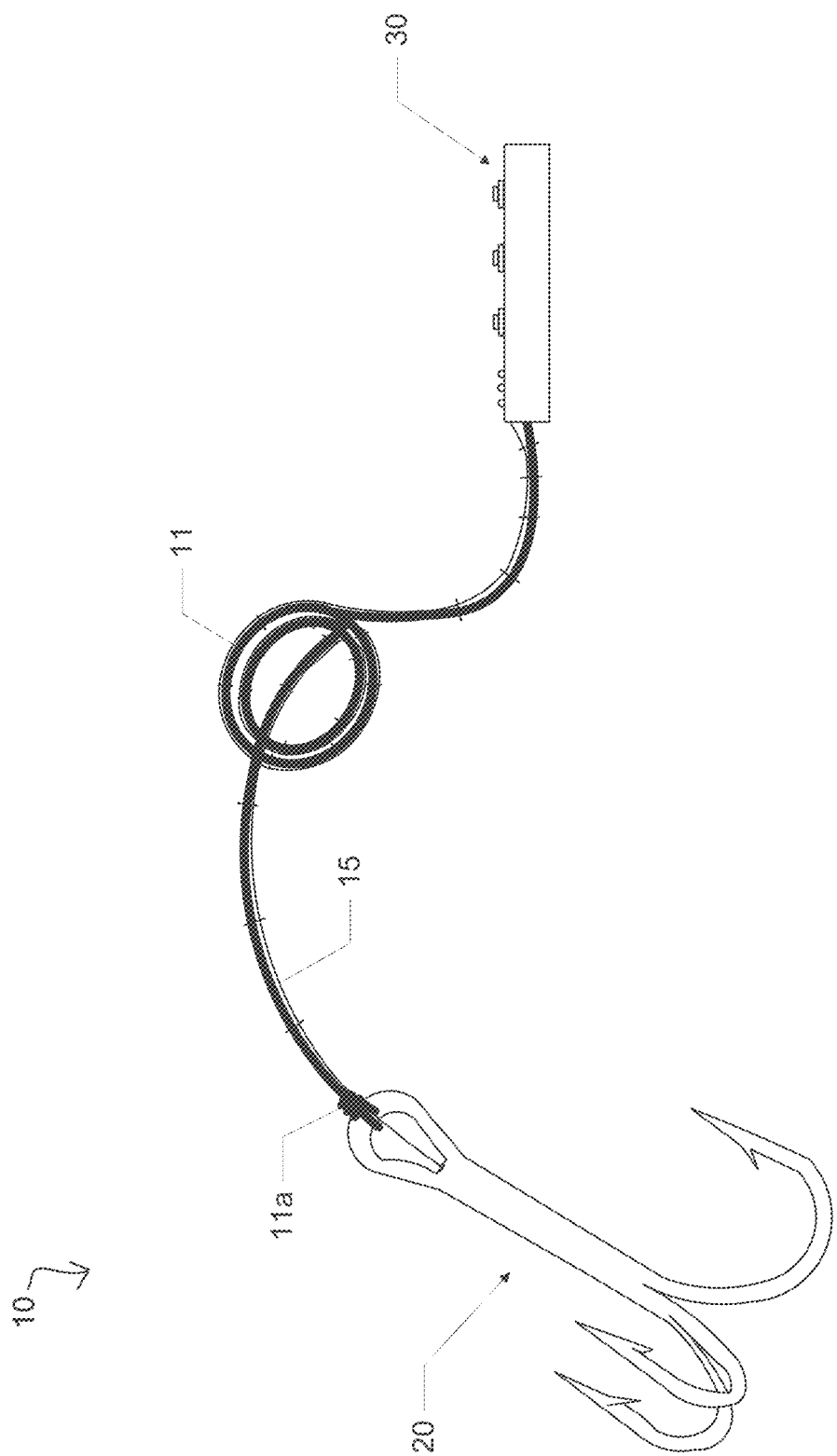
FIG. 1 is a perspective view of an electric snatch hook system in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably positioned," and derivatives thereof shall be used to describe a situation wherein two or more objects are joined together in a non-permanent manner so as to allow the same objects to be repeatedly joined and separated.

FIGS. 1-3A illustrate one embodiment of an electric snatch hook system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown at FIG. 1, one embodiment of the electric hook system 10 can include, essentially, a snatch hook 20 that is connected to a control panel 30 via an elongated tether 11 and control wire 15.

The tether 11 can include a first end 11a that is connected to the ring 24 of the snatch hook 20 and can function to allow a user to physically pull an alligator engaged by the hook from the water. In this regard, the tether can be constructed from any number of different materials having an extremely high tensile strength so as to withstanding a stretching/pulling force of several hundred pounds. Several nonlimiting examples include but are not limited to various types of natural or synthetic rope such as hemp, linen, cotton, nylon, polypropylene, polyester, and polyethylene, for example, however any number of other materials are also contemplated.

The control wire 15 can be connected to a series of electrodes within the hook 20 and to the control panel 30 so as to provide an electrical pathway therebetween. As such, the control wire can be constructed from any number of malleable and electrically conductive metals such as copper wire, for example, and can be coated with an electrically isolative material such as rubber, for example. In one embodiment, the control wire can be positioned within the length of the tether itself; however other embodiments are contemplated wherein the control wire is positioned against the outside surface of the tether and secured thereto via any number of connectors such as zip ties, clamps, or other such devices.

Figure 2:
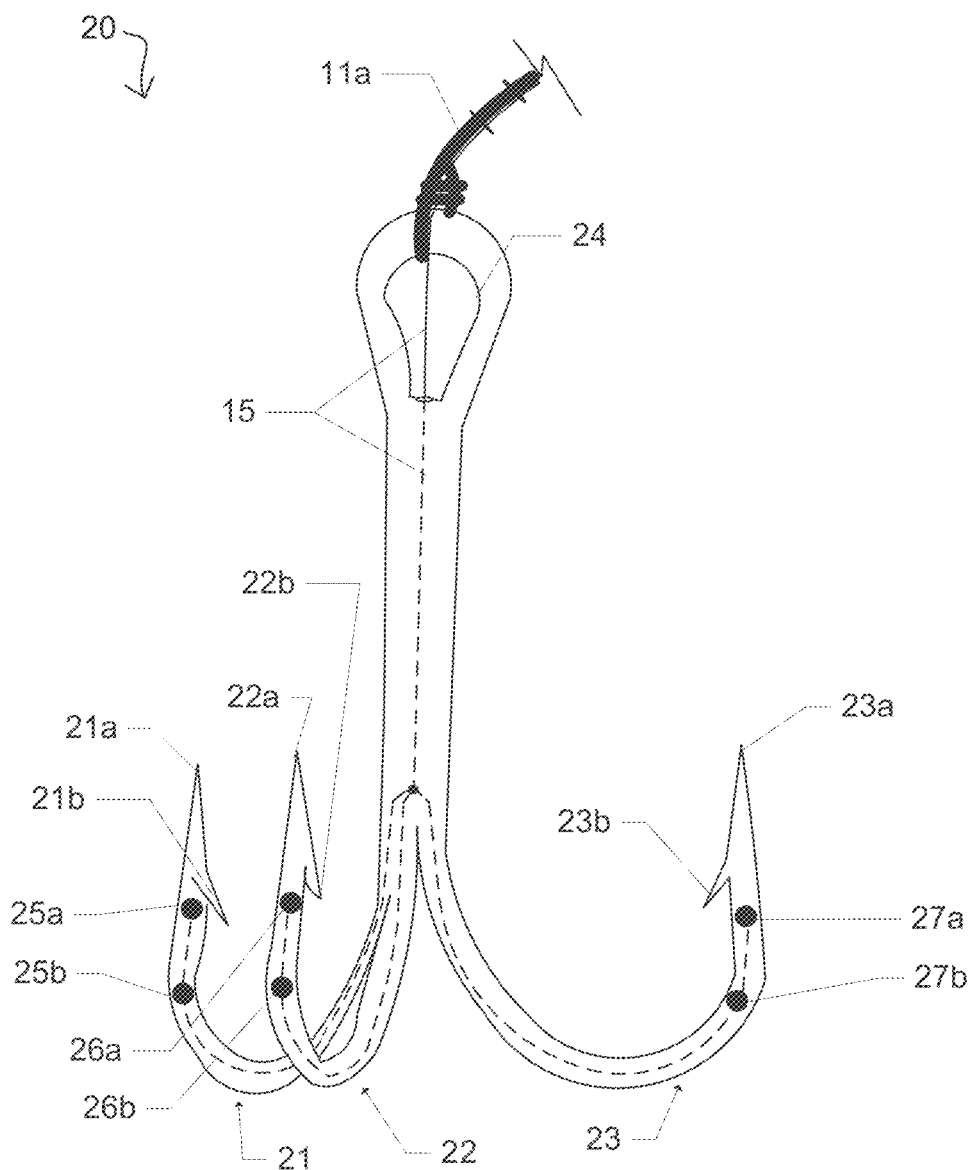
FIG. 2 is a side view of a snatch hook of the snatch hook system, in accordance with one embodiment of the invention.

As shown at FIG. 2, one embodiment of the hook 20 can comprise a treble hook having three individual hook segments 21, 22 and 23 that are attached to a central ring 24. In the preferred embodiment each of the hook segments will be spaced evenly around the ring and can bend outward therefrom. Each of the hooks can include a sharpened tip 21a, 22a and 23a having at least one barb 21b, 22b and 23b positioned adjacent to the tip.

Although illustrated with regard to identical shaped and sized hook segments, this is for illustrative purposes only, as each hook segment can include any number of different shapes and sizes, and may include barbs or other such components as are known in the art. In either instance, the hook will preferably be constructed from a rugged material that is suitable for prolonged exposure to saltwater such as stainless steel, for example, however any number of other construction materials are also contemplated.

In one embodiment, each of the hook segments can include functionality for independently and/or cumulatively delivering an AC voltage across a plurality of electrodes to selectively incapacitate an alligator that is engaged by the hook. In this regard, a first set of electrodes 25a and 25b can be provided along hook segment 21, a second set of electrodes 26a and 26b can be provided along hook segment 22, and a third set of electrodes 27a and 27b can be provided along hook segment 23, respectively. In one embodiment, electrodes 25a, 26a and 27a can comprise high discharge electrodes, and electrodes 25b, 26b and 27b can each comprise low/ground electrodes.

In either instance, each of the electrodes can be electrically connected to the below described power output unit 50 and can be selectively activated via the control panel 30 such that a voltage is provided to the high discharge electrode relative to the low discharge electrode sufficient to stun and incapacitate an alligator.

Providing a high discharge electrode and a low/ground electrode along each hook segment beneficially allows the device to generate and discharge an electrical shock onto the alligator in two distinct manners: 1) between any two hook segments via the high discharge electrode of one hook segment and the low discharge electrode of the other hook segment when both hook segments are in contact with an alligator, and 2) via the two electrodes on a single hook segment when that hook segment is in contact with the alligator.

Figure 3A:
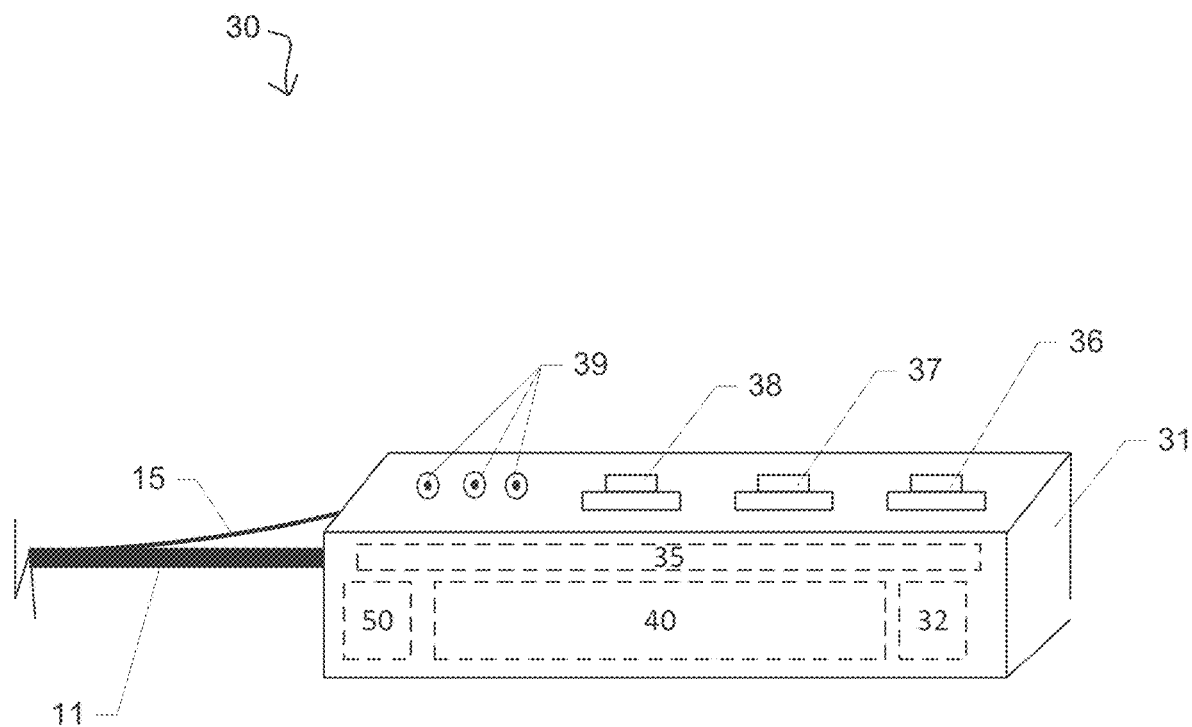
FIG. 3A is a perspective view of a control panel of the snatch hook system, in accordance with one embodiment of the invention.
Figure 3B:
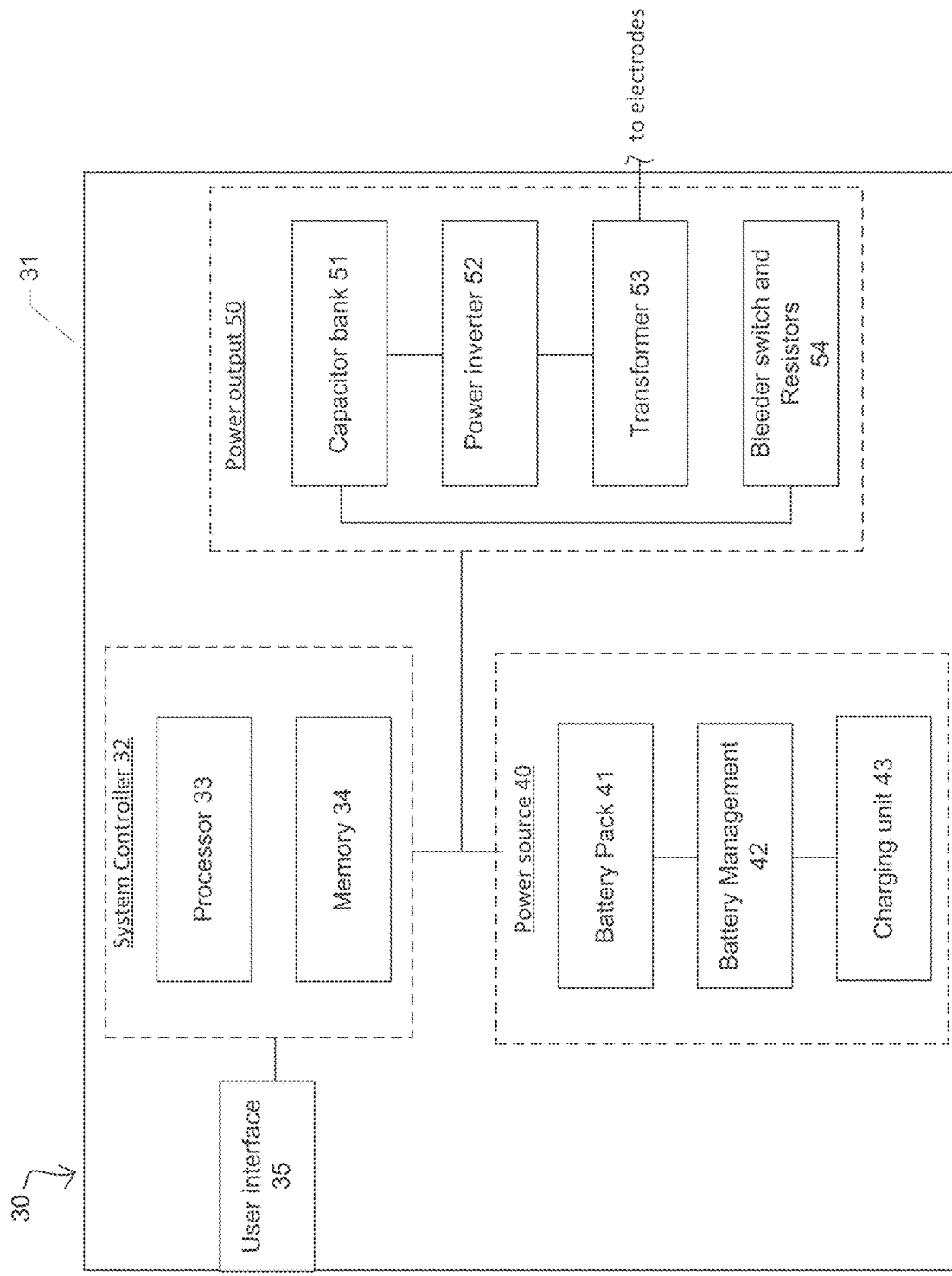
FIG. 3B a simplified block diagram of the control panel of the electric snatch hook system, in accordance with one embodiment of the invention.

FIGS. 3A and 3B illustrate one embodiment of the control panel 30 of the system 10. As shown, the control panel 30 can include a main body 31 for housing a system controller 32, a user interface 35, a power source 40, and a power output unit 50. These components can be connected in accordance with known methodologies using any number of components such as various communication and power cables, system bus, pic controllers, and the like, so as to achieve the functionality described herein.

As described herein the main body 31 can include any number of different shapes and sizes and can be constructed from any number of different materials such as various metals or plastics, for example, that can create a waterproof housing into which the controller components can be located.

The system controller 32 can function to control the operation of the power source and power output unit so as to selectively discharge an AC voltage across the electrodes in the hook segment(s) of the hook 20 in response to a command from the user interface. In one embodiment, the system controller 32 can include at least one central processor 33 which can be provided along one or more printed circuit boards (PCB) containing any number of integrated circuits to complete the activities described herein. To this end, although described as a single processor, the system controller can include any number of different processors and/or central processing units that are conventionally connected to one or more memory components 34 for storing operating instructions in the form of program code for the processor(s) to execute.

The user interface 35 can function to send and/or receive operating instructions or information with a device user and can include any number of different components capable of sending and/or receiving instructions from a device user. In the illustrated embodiment, the user interface 35 can include a plurality of distinct buttons such as a charge button 36, a shock button 37 and discharge button 38, along with any number of visual display elements 39 such as multicolor LED lights, for example which can be located anywhere along the controller body 31 so as to be accessible by a user.

In one embodiment, the shock switch 37 can be magnetically isolated and can include safety features such as a 2-stage activation (e.g., requiring a user to twist and then depress the button) or other such functionality for preventing inadvertent activation of the electrodes. Of course, other embodiments are contemplated wherein different components such as a display screen or touchscreen are provided along the controller body, among others, for example.

The power source 40 can function to receive and store power for use by the device components. In one embodiment, the power source can include a battery pack 41, a battery management unit 42 and a battery charging unit 43.

As described herein, the battery pack 41 can include any number of individual rechargeable power cells which may be arranged serially and/or in parallel to produce a desired voltage such as 12v, 18v, 20v and/or 40v, for example. In the preferred embodiment, the cells will comprise lightweight lithium-ion polymer (LiPo) batteries; however, any number of other battery types are also contemplated. Several non-limiting examples include nickel-cadmium (NiCd), nickel-metal hydride (NiMH), lithium-ion (Li-ion), and rechargeable alkaline batteries, for example. Although described as a battery pack located within the controller housing, other embodiments are contemplated wherein a single battery is utilized and/or wherein the battery pack is located external to the housing and is connected thereto via a cable.

The battery management unit 42 can include any number of circuits and/or individual components such as diodes, transistors, relays, and resistors, for example that can be electrically connected to the batteries to prevent the same from being overcharged and/or for preventing an over voltage or over current situation between the batteries and the controller or power output unit.

The battery charging unit 43 can include an internally located transformer and other circuitry that converts received power into a usable electrical charge for the battery pack 41. To this end, the type of charger and the output voltage will be dependent on the type of cells used and the output voltage of the battery pack 41. For example, if the above described LiPo batteries are utilized within the battery pack, the charger 43 would comprise a Lithium-Ion battery charger having built-in cell balancer. In either instance, the battery charger may include a receptacle for allowing the battery pack to be recharged via a cable plugged into an electrical outlet or may include an NFC charge receiver for conducting wireless charging.

The power output unit 50 can function to receive and selectively discharge power from the power source 40 in response to a command from the user interface 35. In one embodiment, the unit 50 can include a capacitor bank 51, a power inverter 52, a power transformer 53 and a plurality of bleeder resistors 54.

The capacitor bank 51 can function to receive and store electrical energy from the battery pack 41 in response to a user depressing the charge switch 36. During the charging process, the display 39 can notify the user the device is charging via a (yellow) flashing light, for example, and when the capacitor bank is fully charged, the display 39 can turn a solid (green) color. Of course, any number of other notifications and/or colors are also contemplated.

Upon receiving a command from the discharge switch 37, the capacitor bank can rapidly discharge the received power to the power inverter and the display 39 can provide a visual notification such as a solid or flashing (red) light, for example.

The power inverter 52 can function to receive and convert the DC voltage received from the capacitor bank into AC voltage. The output of the power inverter can be immediately fed into the transformer.

The power transformer 53 can comprise a step-up transformer that receives the AC voltage from the inverter, increases the same and transfers the energy directly to the electrodes via the control wire 15. In the preferred embodiment, the output of the power transformer to the electrodes can sustain an electric field at a distance of 75 cm from a point centered between the charge-delivery electrodes up to 150 V/m for up to 30 seconds in fresh or saltwater having a conductivity of 6 S/m. The electric field frequency will ideally be approximately 1000 Hertz. Such amounts being specifically chosen so as to be suitable for stunning an alligator ranging from 50 to 150 pounds with sufficient voltage to immobilize the same for a period of about 1 to 3 minutes, while remaining low enough to ensure such a shock does not permanently injure or kill a human in the unforeseen event, they make contact with the electrodes.

Of course, other amounts are also contemplated wherein a different electrical output can be achieved by the device. To this end, one embodiment is contemplated wherein the transformer comprises a variable output transformer having functionality for allowing a user to adjust the electrical output across any pair of electrodes using the user interface device.

The bleeder unit 54 can also be connected to the capacitor bank 51 and can function to fully dissipate any electric charge in the power output unit. In one embodiment, the bleeder unit can include a switch that can open an electrical pathway from the capacitor bank to a plurality of resistors upon receiving a command from the bleed switch 38. During this time, the display 39 can provide a flashing (orange) light, for example.

In another embodiment, the bleeder unit can be automatically activated by the controller upon determining that the capacitor bank has been in a fully charged state for a predetermined period of time such as 2 minutes, for example. The inclusion of the bleeder unit acting as a built-in safety device for preventing a situation wherein the electrodes are inadvertently discharged, so as to ensure the device remains uncharged and safe between uses. Of course, any number of other components are contemplated for discharging and rendering the system safe.

In operation, a user can throw and drag the hook along a body of water until the hook engages an alligator. Once engaged, at least one of the hook segments will pierce the skin of the alligator so that the electrodes are in contact with the alligator's body. At this time, a user can charge and shock the alligator in order to prevent the alligator from thrashing and rolling while being pulled via the tether onto a boat or shoreline. Once captured, the alligator can be quickly and humanely dispatched, thus reducing the stress and trauma imparted on the animal during the hunt.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A snatch hook system, comprising:
   a hook having a central ring and at least one hook segment having a curved shape and a sharpened tip;
   a pair of electrodes that are positioned along the at least one hook segment;
   an elongated tether having a first end that is connected to the central ring of the hook; and
   a control panel that is connected to a second end of the elongated tether,
   wherein the control panel includes functionality for selectively providing an electrical charge to the pair of electrodes.

2. The system of claim 1, wherein the control panel includes a power source.

3. The system of claim 2, wherein power source includes a battery bank having a plurality of rechargeable batteries.

4. The system of claim 3, wherein the power source includes a battery charger.

5. The system of claim 2, further comprising:
   a power output unit having a capacitor that is in communication with the power source.

6. The system of claim 5 wherein the capacitor receives power from the power source in response to a user instruction from a user interface.

7. The system of claim 5, wherein the power output unit includes a transformer that is in communication with the capacitor and each of the pair of electrodes.

8. The system of claim 7, wherein the transformer receives power from the capacitor, amplifies the received power, and discharges amplified power to the pair of electrodes in response to a user instruction from the user interface.

9. The system of claim 1, further comprising:
   a control wire that is connected to the pair of electrodes along a first end, and the control panel along a second end.

* * * * *